(12) United States Patent
Matsugami et al.

(10) Patent No.: US 11,550,489 B2
(45) Date of Patent: Jan. 10, 2023

(54) STORAGE SYSTEM AND PROCESSING MIGRATION METHOD

(71) Applicant: HITACHI, LTD., Tokyo (JP)

(72) Inventors: Kazuki Matsugami, Tokyo (JP); Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/194,743

(22) Filed: Mar. 8, 2021

(65) Prior Publication Data

US 2022/0027073 A1 Jan. 27, 2022

(30) Foreign Application Priority Data

Jul. 21, 2020 (JP) .............................. JP2020-124197

(51) Int. Cl.
*G06F 3/06* (2006.01)
*H04L 67/1097* (2022.01)

(52) U.S. Cl.
CPC .......... *G06F 3/0647* (2013.01); *G06F 3/0617* (2013.01); *G06F 3/0658* (2013.01); *G06F 3/0688* (2013.01); *H04L 67/1097* (2013.01)

(58) Field of Classification Search
CPC .... G06F 3/0647; G06F 3/0631; G06F 3/0617; G06F 3/065; G06F 3/0635
See application file for complete search history.

(56) References Cited

U.S. PATENT DOCUMENTS

| | | | |
|---|---|---|---|
| 8,495,325 B2 | 7/2013 | Yamamoto et al. | |
| 2006/0236056 A1* | 10/2006 | Nagata | G06F 3/061 |
| | | | 711/165 |
| 2008/0126697 A1* | 5/2008 | Elliott | G06F 11/201 |
| | | | 711/100 |
| 2014/0089445 A1* | 3/2014 | Suzuki | H04L 67/1097 |
| | | | 709/212 |

\* cited by examiner

*Primary Examiner* — Aracelis Ruiz
(74) *Attorney, Agent, or Firm* — Volpe Koenig

(57) ABSTRACT

A storage system includes a storage drive that stores data and a plurality of storage apparatuses, each generating access data and writing data into the storage drive, and accessing data in the storage drive using the access data, and in a case of migrating the volume together with the access data between the storage apparatuses, one responsible for the write processing on the volume being migrated to a migration destination storage apparatus at a time of migration of the access data, and one responsible for the read processing on the volume being performed by a migration source storage apparatus using the access data, and the one responsible for the read processing being migrated to the migration destination storage apparatus after the access data is available for the migration destination storage apparatus.

10 Claims, 13 Drawing Sheets

FIG.3
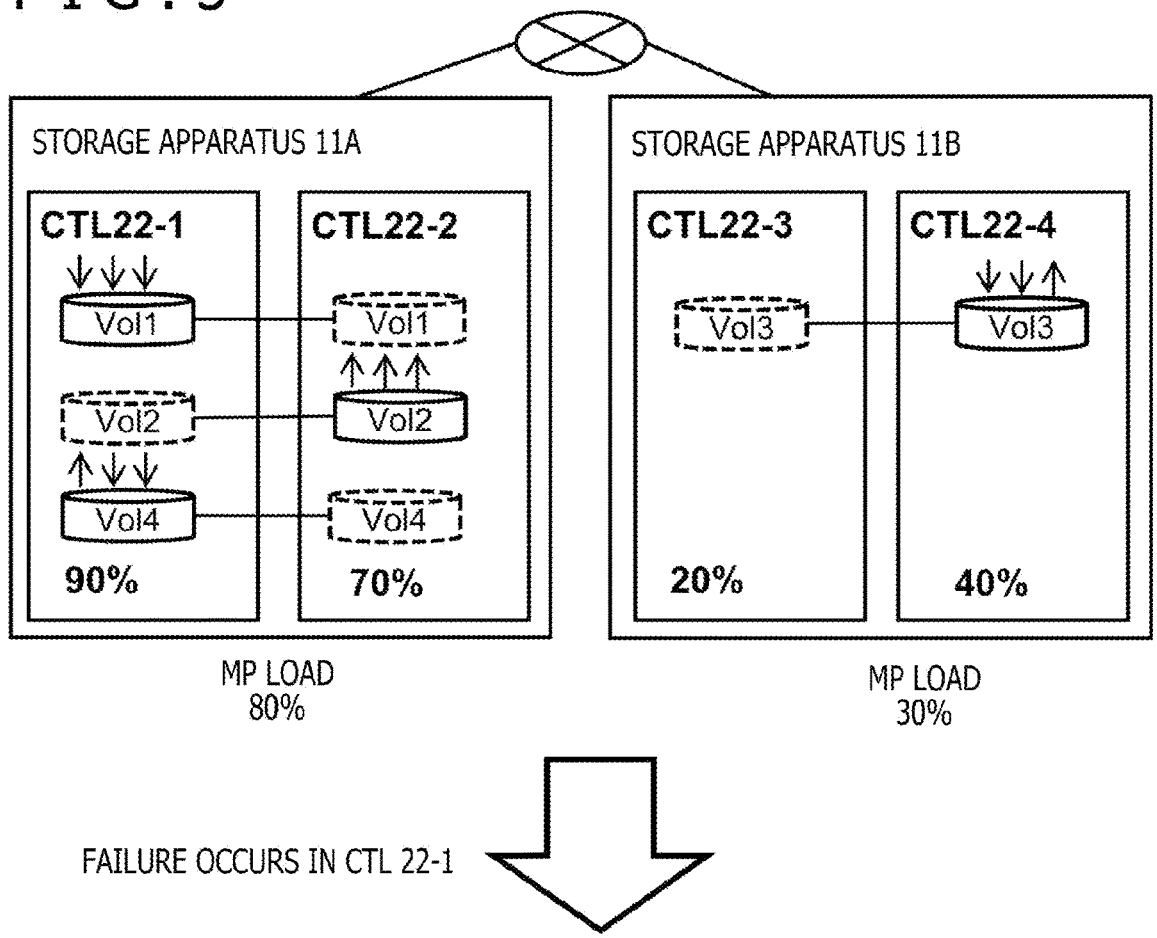
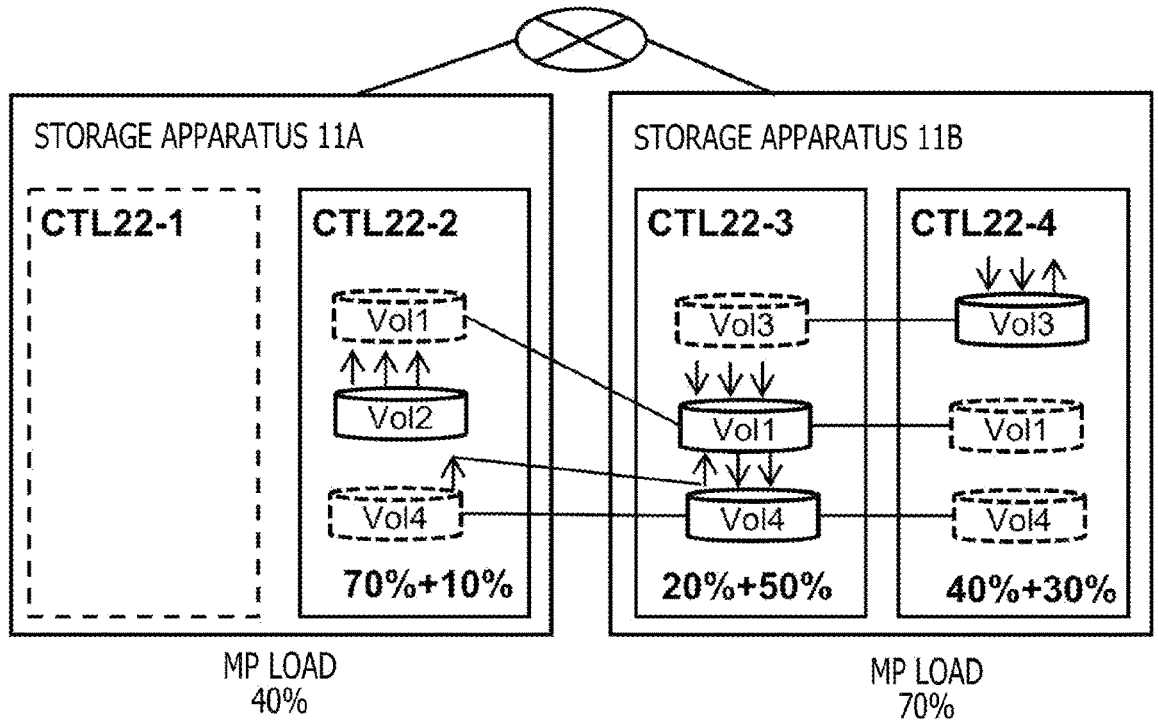

| LOGICAL ADDRESS | UPDATE BIT | NODE ID | PHYSICAL ADDRESS | DATA SIZE |
|---|---|---|---|---|
| 0x10001000 | 0 | 0 | 0xF0005000 | 8KB |
| 0x10002000 | 1 | 1 | 0xF0005000 | 8KB |
| 0x10008000 | 1 | 1 | 0xF0008000 | 1KB |
| ... | ... | ... | ... | ... |

| VOLUME ID | VOLUME ATTRIBUTE | VOLUME CAPACITY | VOLUME CONSUMED CAPACITY | VOLUME LOGICAL ADDRESS | ALLOCATION DESTINATION POOL ID |
|---|---|---|---|---|---|
| 0 | THIN PROVISIONING | 100GB | 50GB | 0x10000000 | 0 |
| 1 | THIN PROVISIONING | 200GB | 20GB | 0x10C80000 | 0 |
| 2 | VALID COMPRESSION | 100GB | 10GB | 0x12580000 | 0 |
| 3 | VALID COMPRESSION | 200GB | 20GB | 0x13200000 | 0 |
| ... | ... | ... | ... | ... | ... |

| POOL ID | POOL CAPACITY | POOL CONSUMED CAPACITY | DEPLETION THRESHOLD | RAID GROUP ID |
|---|---|---|---|---|
| 0 | 10TB | 3TB | 80% | 0<br>1 |
| ... | ... | ... | ... | ... |

FIG.8

<sub>208</sub>

| RAID GROUP ID (81) | RAID LEVEL (82) | DRIVE ID (83) | DRIVE TYPE (84) | CAPACITY (85) | USED CAPACITY (86) |
|---|---|---|---|---|---|
| 0 | RAID5 | 0<br>1<br>2<br>3 | SSD | 3TB | 1TB |
| 1 | RAID5 | 4<br>5<br>6<br>7 | HDD | 15TB | 2TB |
| ... | ... | ... | ... | ... | ... |

FIG.9

<sub>209</sub>

| VOLUME ID (91) | I/O LIMITING THRESHOLD (92) | I/O EFFECTIVE VALUE (93) | I/O LOAD (94) | WRITE I/O (95) | WRITE I/O LOAD (96) | READ I/O (97) | READ I/O LOAD (98) |
|---|---|---|---|---|---|---|---|
| 0 | 100KIOPS | 75KIOPS | 36% | 30KIOPS | 29% | 45KIOPS | 7% |
| 1 | 50KIOPS | 50KIOPS | 12% | 5KIOPS | 5% | 45KIOPS | 7% |
| 2 | 30KIOPS | 25KIOPS | 12% | 10KIOPS | 10% | 15KIOPS | 2% |
| 3 | 100KIOPS | 100KIOPS | 24% | 10KIOPS | 10% | 90KIOPS | 14% |
| ... | ... | ... | ... | ... | ... | ... | ... |

| VOLUME ID (101) | VOLUME LOGICAL CAPACITY (102) | VOLUME CONSUMED CAPACITY (103) | I/O LIMITING VALUE (104) | I/O EFFECTIVE VALUE (105) | ALLOCATION DESTINATION NODE ID (106) |
|---|---|---|---|---|---|
| 0 | 100GB | 50GB | 100KIOPS | 75KIOPS | 0 → 1 |
| 1 | 200GB | 20GB | 50KIOPS | 50KIOPS | 0 |
| 2 | 100GB | 10GB | 30KIOPS | 25KIOPS | 0 → 1 |
| 3 | 200GB | 20GB | 100KIOPS | 100KIOPS | 0 |
| ... | ... | ... | ... | ... | ... |

| NODE ID (111) | AMOUNT OF SPACE (112) | OVERLOAD THRESHOLD (113) | EFFECTIVE LOAD (114) | DISTRIBUTABLE LOAD (115) | READ LOAD FROM OTHER NODE (116) |
|---|---|---|---|---|---|
| 0 | 5TB | 80% | 84% → 45% | 54% → 15% | 0% → 9% |
| 1 | 1TB | 80% | 0% → 39% | 0% → 39% | 0% |
| ... | | ... | ... | ... | ... |

STORAGE SYSTEM AND PROCESSING MIGRATION METHOD

BACKGROUND OF THE INVENTION

1. Field of the Invention

The present invention relates to a storage system and a processing migration method.

2. Description of the Related Art

In general, a storage system is provided with one or more storage apparatuses. Each of the one or more storage apparatuses is generally provided with, for example, a hard disk drive (HDD) or a solid state drive (SSD) as a storage medium. The storage system is accessed by one or a plurality of higher-level apparatuses (for example, host computing machines) via a storage area network (SAN) or a local area network (LAN). In general, the reliability of the storage apparatus improves by using a reliability improving method according to a redundant array of independent (or inexpensive) disks (RAID) technology.

An apparatus service life of each storage apparatus configuring the storage system is generally defined in consideration of matters of durable lives of components, and a replacement of the storage apparatus is required based on a cycle of the service life thereof. In replacement of the storage apparatus, data stored in the existing storage apparatus is migrated to a new storage apparatus to be replaced with the existing apparatus. A non-disruptive migration technology without stopping access from the higher-level apparatuses is widely used as a method of data migration between the storage apparatuses. U.S. Pat. No. 8,495,325 discloses a data migration scheme capable of data migration between a migration source storage apparatus and a migration destination storage apparatus without stopping access between a host computing machine and each of the storage systems. With the technology of U.S. Pat. No. 8,495,325, after an access path is set between the host computing machine and the migration destination storage apparatus, a status of the next access path is set to an available state. When the access path is available between the host computing machine and the migration destination storage apparatus, data is migrated from the migration source storage apparatus to the migration destination storage apparatus.

With the conventional technology, however, it is necessary to reflect an update of a host I/O or the like in both the migration source and the migration destination during replacement so that it is possible to handle a failure during the replacement. Owing to this, a problem occurs that an increase in a volume of data to be migrated adversely influences a performance for a long period of time. As a result, in a case of migration of processing of the storage apparatus, it is necessary to maintain availability and performance.

The present invention has been achieved to solve the problems, and an object of the present invention is to provide a storage system and a processing migration method capable of migration of processing of a storage apparatus while maintaining availability and performance.

SUMMARY OF THE INVENTION

To attain the object, one of representative storage systems according to the present invention is a storage system including: a storage drive that physically stores data; and a plurality of storage apparatuses each including a controller and providing a volume from and to which a host inputs and outputs data, each of the storage apparatuses generating access data and writing data into the storage drive at a time of write processing for writing data to the volume, and accessing data in the storage drive using the access data at a time of read processing for reading data from the volume, and in a case of migrating the volume together with the access data between the storage apparatuses, one responsible for the write processing on the volume being migrated to a migration destination storage apparatus at a time of migration of the access data, and one responsible for the read processing on the volume being performed by a migration source storage apparatus using the access data, and the one responsible for the read processing being migrated to the migration destination storage apparatus after the access data is available for the migration destination storage apparatus. Furthermore, one representative processing migration method according to the present invention is a processing migration method in a storage system including a storage drive that physically stores data and a plurality of storage apparatuses each including a controller and providing a volume from and to which a host inputs and outputs data, the processing migration method including: by each of the storage apparatuses, generating access data and writing data into the storage drive at a time of write processing for writing data to the volume, and accessing data in the storage drive using the access data at a time of read processing for reading data from the volume; and in a case of migrating the volume together with the access data between the storage apparatuses, migrating one responsible for the write processing on the volume to a migration destination storage apparatus at a time of migration of the access data, and one responsible for the read processing on the volume being performed by a migration source storage apparatus using the access data, and migrating the one responsible for the read processing to the migration destination storage apparatus after the access data is available for the migration destination storage apparatus.

According to the present invention, it is possible to migrate processing of a storage apparatus while maintaining availability and performance. Objects, configurations, and advantages other than those described above are made clear by the description of embodiments given below.

BRIEF DESCRIPTION OF THE DRAWINGS

FIG. 3 is an explanatory diagram of load adjustment;

FIG. 5 is an explanatory diagram illustrating an example of configurations of a logical-to-physical translation table;

FIG. 6 is an explanatory diagram illustrating an example of configurations of a volume management table;

FIG. 7 is an explanatory diagram illustrating an example of configurations of a management table for RAID group allocation to pools;

FIG. 8 is an explanatory diagram illustrating an example of configurations of a management table for allocating drive allocation to RAID groups;

FIG. 9 is an explanatory diagram illustrating an example of configurations of a per-volume I/O load information management table;

FIG. 10 is an explanatory diagram illustrating an example of configurations of a volume load management table;

FIG. 11 is an explanatory diagram illustrating an example of configurations of a volume placement management table;

DESCRIPTION OF THE PREFERRED EMBODIMENTS

Figure 1:
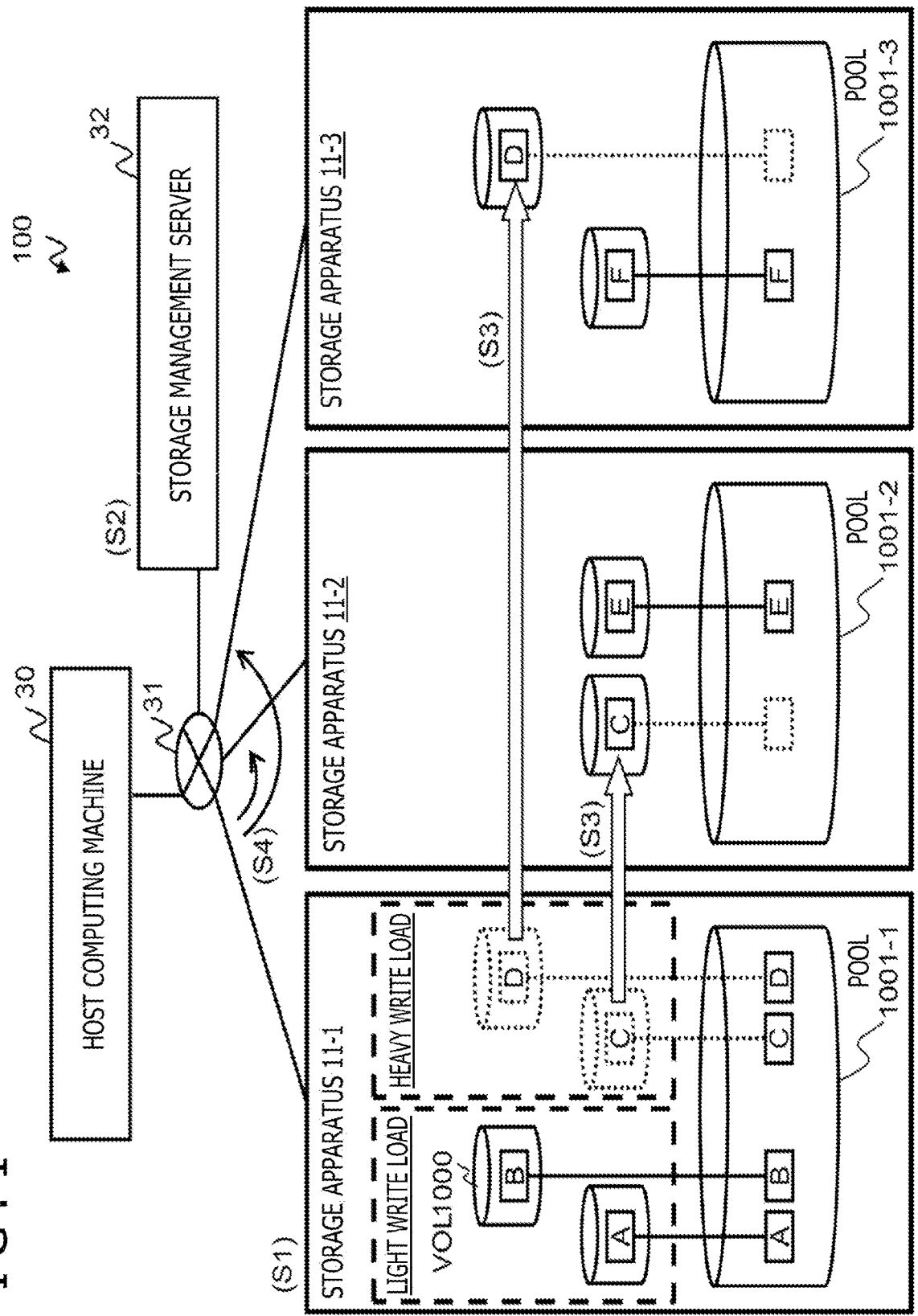
FIG. 1 is an explanatory diagram illustrating volume migration procedures in a storage system according to an embodiment of the present invention.

Embodiments of the present invention will be described hereinafter with reference to the drawings. In the accompanying drawings, functionally identical elements are often denoted by the same numbers. The accompanying drawings illustrate specific embodiments according to the principle of the present invention. Those embodiments are given for help understand the present invention and are not supposed to be used for interpreting the present invention in a limited fashion.

Furthermore, the embodiments of the present invention may be implemented as software running on a general-purpose computer, implemented as dedicated hardware, or implemented as a combination of software and hardware.

Each processing in the embodiments of the present invention is often described hereinafter with a "program" used as a subject (acting subject). Since processing specified by being executed by a processor is performed in the program with a memory and a communication port (communication controller), the processing may be described with the processor used as the subject. Part of or entirety of the program may be realized by dedicated hardware or modularized. Various types of programs may be installed in each computing machine by a program distribution server or a storage media.

In the following description, an "interface section" may include at least one of a user interface section and a communication interface section. The user interface section may include at least one I/O device out of one or more I/O devices (for example, an input device (such as a keyboard and a pointing device) and an output device (such as a display device)) and a display computing machine. The communication interface may include one or more communication interface devices. The one or more communication interface devices may be one or more communication interface devices of the same type (for example, one or more network interface cards (NICs)) or two or more communication interface devices of different types (for example, NIC or NICs and a host bus adapter or adapters (HBA or HBAs)).

Moreover, in the following description, a "memory section" includes one or more memories. At least one memory may be a volatile memory or a non-volatile memory. The memory section is used mainly at a time of processing by a processor section.

Furthermore, in the following description, the "processor section" includes one or more processors. At least one processor is typically a central processing unit (CPU).

Moreover, in the following description, information is often described using such an expression as "xxx table," the information may be expressed by any data structure. In other words, the "xxx table" can be rephrased by "xxx information" to indicate that information does not depend on the data structure. Moreover, in the following description, configurations of each table are given as an example, one table may be divided into two or more tables, and entirety or part of two or more tables may be one table.

Furthermore, in the following description, common reference characters out of reference characters are often used in a case of describing elements of the same type without distinguishing the elements, and reference characters (or IDs (for example, identification numbers) of elements) are often used in a case of distinguishing the elements of the same type. For example, in a case of not distinguishing a plurality of storage apparatuses, the storage apparatuses are denoted by "storage apparatuses 11." In a case of distinguishing the storage apparatuses, the storage apparatuses are denoted by a "storage apparatus 11-1" and a "storage apparatus 11-2," or a "storage apparatus 11A" and a "storage apparatus 11B." The same thing is true for other elements.

Moreover, in the following description, a "storage system" includes one or more storage apparatuses. At least one storage apparatus may be a general-purpose physical computing machine. Furthermore, at least one storage apparatus may be a virtual storage apparatus and execute software-defined anything (SDx). For example, a software defined storage (SDS) (an example of a virtual storage apparatus) or a software-defined datacenter (SDDS) can be adopted as the SDx.

Embodiments of the present invention will be described hereinafter with reference to the drawings.

EMBODIMENTS

<Volume Migration Procedures>

FIG. 1 is an explanatory diagram illustrating volume migration procedures in a storage system 100 according to an embodiment of the present invention. The storage system 100 has a host computing machine 30, a plurality of storage apparatuses 11, and a storage management server 32. The host computing machine 30 is connected to the storage apparatuses 11 via a network 31.

The plurality of storage apparatuses 11 each have one or a plurality of volumes (VOLs) 1000 each logically storing therein data, and the one or the plurality of volumes are configured with a pool 1001. FIG. 1 illustrate a state in which a storage apparatus 11-1 uses a pool 1001-1, a storage apparatus 11-2 uses a pool 1001-2, and a storage apparatus 11-3 uses a pool 1001-3.

It is noted herein that the pool 1001-1 of the storage apparatus 11-1 contains a volume that stores data A, a volume that stores data B, a volume that stores data C, and a volume that stores data D. Furthermore, the pool 1001-2 of the storage apparatus 11-2 contains a volume that stores data E, and the pool 1001-3 of the storage apparatus 11-3 contains a volume that stores data F.

Furthermore, the storage apparatuses 11 are each provided with one or a plurality of storage controllers. The storage controller in the present embodiment corresponds to a controller in claims and processes access from the host computing machine 30.

In a case of executing data write processing (write) based on a write request from the host computing machine 30, the storage controller generates and manages access data necessary to access written data. The access data is so-called allocation information and contains, for example, volume configuration information and metadata. This access data enables a host-side logical address to correspond to a drive-side physical address. Therefore, in a case of receiving a request of read processing (read) designated by the logical address, it is possible to locate the physical address of data to be accessed.

In a case of migration of processing by one storage controller to the other storage controller, the storage management server 32 migrates write processing to the storage controller as a migration destination out of a series of processing responsible for the storage controller as a migration source to cause the migration destination storage controller to be responsible for the write processing, while leaving read processing in the migration source storage controller to cause the migration source storage controller to be responsible for the read processing. A state of causing different storage controllers to be responsible for the write processing and the read processing in this way is referred to as "responsible-party separation state" for the sake of convenience.

In the responsible-party separation state, an access destination of the host computing machine 30 is the migration destination storage controller responsible for the write processing. The storage controller responsible for the write processing is capable of the write processing although not holding access data about the migration source. Upon receiving a write request, the storage controller responsible for the write processing stores write data to correspond to the logical address designated by the host computing machine 30, and creates and holds access data such as the metadata.

The storage controller responsible for the write processing receives a read request from the host computing machine 30, and executes read processing in a case in which data to be read is data written by the same controller. The case in which data to be read is data written by the same controller is a case in which the storage controller responsible for the write processing creates and holds corresponding access data. Meanwhile, in a case in which data to be read is not data written by the same controller, the storage controller responsible for the write processing transfers the read request to the storage controller responsible for the read processing to cause the storage controller responsible for the read processing to execute the read processing.

Since a network load is used to transfer the read processing, it is desirable to end the responsible-party separation state early. The storage management server 32 causes the storage controllers to perform processing in the responsible-party separation state, and migrates the access data managed by the migration source storage controller to the migration destination storage controller. The storage management server 32 also migrates volume data together with this access data between the two storage apparatuses. Subsequently, the storage management server 32 migrates the read processing to the migration destination storage controller, ends the responsible-party separation state, and completes the migration. It is noted that the migration destination storage controller performs merging processing when the access data (such as the volume configuration information and the metadata) is transmitted from the migration source storage controller to the migration destination storage controller. For example, in the merging processing, the migration destination storage controller rewrites the metadata and the like in such a manner that data before update is made invalid for a range in which the migration destination storage controller performs write processing to update data.

In this way, the storage management server 32 can migrate the storage controller responsible for write processing first and then moves the storage controller responsible for read processing to quickly migrate a load in a case in which the load is to be migrated in an emergency such as a controller failure.

Preferentially migrating the volume with a heavy write load in a case of migrating the volume in the storage apparatus 11-1 to the other storage apparatus makes it possible to efficiently reduce the load of the storage apparatus 11-1. Furthermore, by referring to loads of the storage apparatuses and selecting one of the storage apparatuses as the migration destination storage apparatus in such a manner that the load does not surpass a processing capability even when migration from the storage apparatus 11-1 is accepted at a time of determining the migration destination, it is possible to prevent a performance degradation of the storage system 100.

A specific example is as follows.

(S1) A state in which volume migration is necessary occurs in the storage apparatus 11-1. Examples of the state in which volume migration is necessary include a case in which a failure occurs in one of the two storage controllers and the processing capability of the storage apparatus 11-1 is reduced by half.

(S2) The storage management server 32 that monitors load statuses of the storage apparatuses 11-1 to 11-3 determines that the volume of the storage apparatus 11-1 is necessary to migrate to the other storage apparatus and selects the migration destination. Specifically, the storage management server 32 determines the storage apparatus 11-2 as the migration destination to which the volume that stores the data C is migrated since the volume that stores the data C is a heavy write load. Likewise, the storage management server 32 determines the storage apparatus 11-3 as the migration destination to which the volume that stores the data D is migrated since the volume that stores the data D is a heavy write load.

(S3) The storage apparatus 11-1 migrates the party responsible for the write processing on the volume that stores the data C to the storage apparatus 11-2. Furthermore, the storage apparatus 11-1 migrates the party responsible for the write processing on the volume that stores the data D to the storage apparatus 11-3.

(S4) The access destination when the host computing machine 30 accesses the data C is changed over from the storage apparatus 11-1 to the storage apparatus 11-2. Furthermore, the access destination when the host computing machine 30 accesses the data D is changed over from the storage apparatus 11-1 to the storage apparatus 11-3.

In this way, in the storage system 100, the access destination of the host computing machine 30 is changed over after moving the party responsible for the write processing to the migration destination without moving data in the volume to the migration destination. Subsequently, the write request to the migrated volume is executed by the pool in the migration destination, and the read request to the migrated volume is executed by the pool in the migration source.

<Write Processing and Read Processing after Migration>

Figure 2:
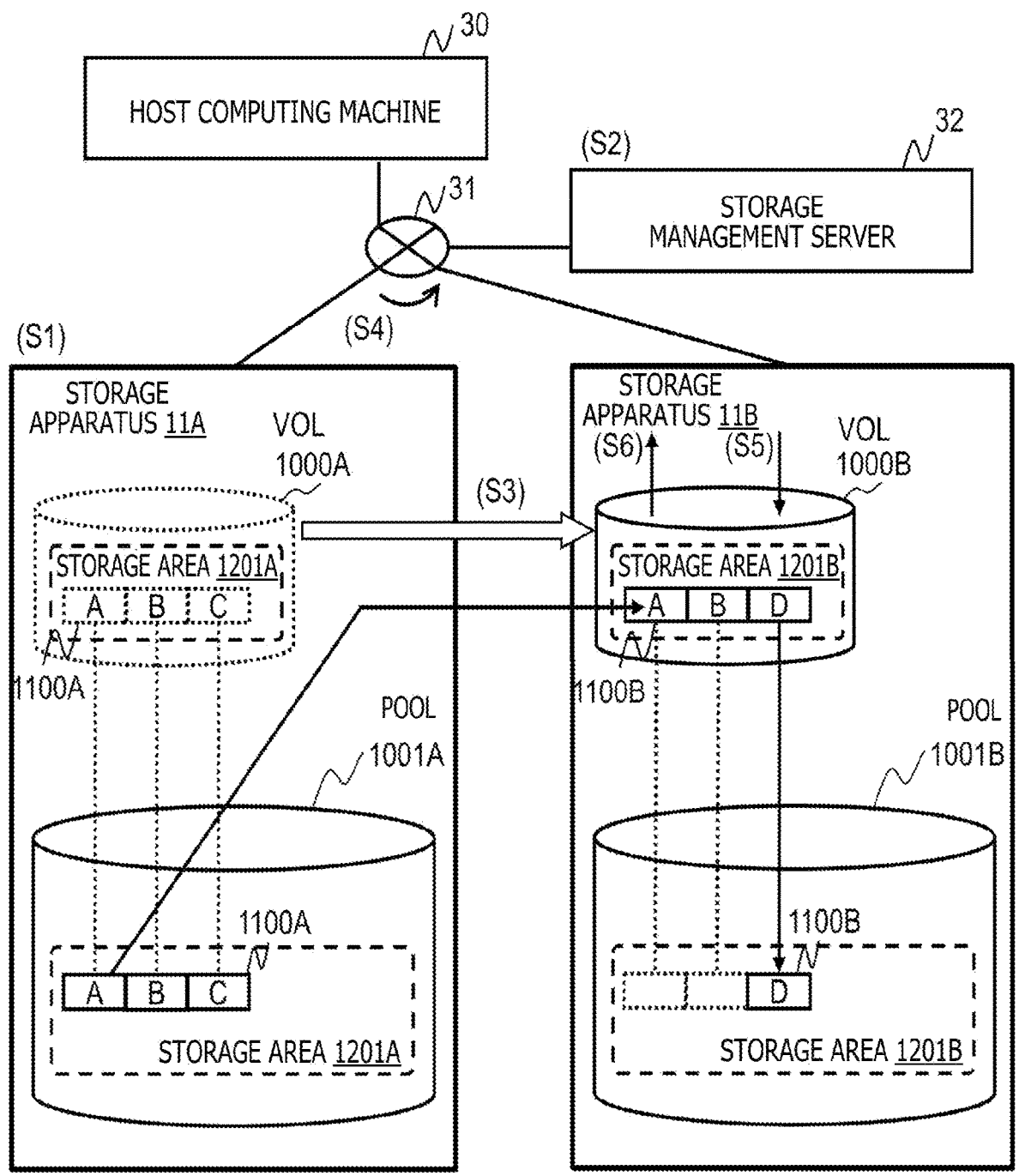
FIG. 2 is an explanatory diagram of write processing and read processing after migration.

FIG. 2 is an explanatory diagram of write processing and read processing after migration. In FIG. 2, (S1) to (S4) are similar to those in FIG. 1, a volume 1000A in a storage apparatus 11A is migrated to a volume 1000B in a storage apparatus 11B, and the access destination of the host computing machine 30 is changed over to the storage apparatus 11B.

(S5) A write request to the migrated volume is received by the migration destination storage apparatus 11B. In this case, the storage apparatus 11B writes data to a pool 1001B in the storage apparatus 11B.

(S6) A read request to the migrated volume is received by the migration destination storage apparatus 11B. In this case, the migration destination storage apparatus 11B asks the migration source storage apparatus 11A to acquire data in a pool 1001A in the storage apparatus 11A, and transmits the acquired data to the host apparatus 30 in response to the read request.

In FIG. 2, a storage area 1201A of the volume 1000A corresponds to a storage area 1202A of the pool 1001A, and data 1100A is stored in the storage area 1202A at a time of migration. The data 1100A contains "A," "B," and "C."

As a result of the migration, the volume 1000A is migrated to a volume 1000B in the storage apparatus 11B. A storage area 1201B of the volume 1000B corresponds to a storage area 1202B of a pool 1001B.

At the time of the migration, data 1100B in the storage apparatus 11B does not reflect the data 1100A. However, in the case of the read request, the storage apparatus 11B asks the storage apparatus 11A to read data from the data 1100A (that is, from the pool 1001A); thus, the host computing machine 30 can read data without influence of the migration. Moreover, as for data write, the data is written to the storage area 1202B of the pool 1001B and the data 1100B is updated. FIG. 2 illustrates a state in which "C" is updated to "D," and in which the data 1100B contains "A," "B," and "D."

In this way, the write processing is completed by the migration destination storage apparatus 11B and does not impose any load on the migration source storage apparatus 11A. Furthermore, the data in the storage apparatus 11A is not updated but kept to a content at the time of the migration.

<Load Adjustment>

FIG. 3 is an explanatory diagram of load adjustment. In FIG. 3, the storage apparatus 11A is provided with storage controllers (CTLs) 22-1 and 22-2. The storage controllers 22-1 and 22-2 each process access from the host computing machine 30 to the volume for which the storage controllers 22-1 and 22-2 are responsible, and mutually function as redundant controllers. Specifically, the storage controller 22-1 processes accesses to volumes VOl1 and Vol4, while the storage controller 22-2 processes an access to a volume Vol2.

Furthermore, a load of the storage controller 22-1 is 90% of the processing capability, while a load of the storage controller 22-2 is 70% of the processing capability. Owing to this, the storage apparatus 11A realizes both of redundancy and running with an 80% load.

Likewise, the storage apparatus 11B is configured with storage controllers (CTLs) 22-3 and 22-4. The storage controllers 22-3 and 22-4 each process access from the host computing machine 30 to the volume for which the storage controllers 22-3 and 22-4 are responsible, and mutually function as redundant controllers. FIG. 3 illustrates a state in which the storage controller 22-4 processes an access to a volume Vol3, and in which the storage controller 22-3 has no volume for which access is processed.

A load of the storage controller 22-3 is 20% of the processing capability, while a load of the storage controller 22-4 is 40% of the processing capability. Owing to this, the storage apparatus 11B runs with a 30% load.

Upon occurrence of a failure in the storage controller 22-1, the processing on the volume for which the storage controller 22-1 is responsible is migrated to the storage controllers in the other storage apparatus, according to the write load of each volume.

It is assumed herein that the storage controllers 22-1 to 22-4 are all equal in processing capability. It is also assumed that the write load of the volume Vol1 consumes 50% of the processing capability of the storage controller 22-1, the write load of the volume Vol4 consumes 30% thereof, and a sum of read loads of the volumes Vol1 and Vol4 consumes 10% thereof.

In this case, the processing on the volume Vol1 with the heavy write load is migrated to the storage controller 22-3 with a lightest load, and the processing on the volume Vol4 is migrated to the storage controller 22-4. Furthermore, the write loads are imposed on the migration destination storage controllers and the read loads are imposed on the redundant storage controller. Thus, the load of the storage controller 22-2 is 70%+10%, the load of the storage controller 22-3 is 20%+50%, and the load of the storage controller 22-4 is 40%+30%. As a result, the load of the storage apparatus 11A accounts for 40% of the original processing capability of the storage apparatus 11A and the load of the storage apparatus 11B accounts for 70% of the original processing capability of the storage apparatus 11B.

In this way, the storage system 100 according to the present embodiment can promptly realize processing migration since migrating the processing without waiting for reflection of data.

Furthermore, in an example of FIG. 3, the responsible-party separation state between the storage apparatuses 11A and 11B can be similarly applied.

Specifically, in the storage system 100, the migration destination storage controllers execute the write processing after the migration, and the redundant controller of the storage controller before the migration executes the read processing after the migration.

Since the write load is generally heavier than the read load, the migration of the write processing makes it possible to suppress an increase in the load of the storage controller as the redundant controller and to prevent the performance degradation.

Furthermore, the storage system 100 can avoid the performance degradation of the migration destination storage apparatuses by selecting each storage controller as the migration destination in such a manner that the load is within the range of the processing capability even if the load of the migrated write processing is added to the load of the storage controller.

Specifically, the storage controller is capable of running without occurrence of the performance degradation even in a circumstance of occurrence of a failure in the redundant controller if the sum of the loads of the write processing and the read processing on the volume or volumes for which the storage controller is responsible and the load of the read processing of the storage controller responsible for redundancy is within the processing capability of the storage controller itself. The storage system 100 executes selection such that all the storage controllers satisfy this condition even after the migration at a time of selection of the migration destination.

It is noted that the storage system 100 is capable of using an optional index indicating an actual record of the write processing in a case of evaluating the loads of the write processing. For example, a ratio of the read processing to the write processing, a frequency of occurrence of the write processing, and a ratio of the loads to the processing capability may be used. By way of example, it is appropriate to select the volume for which a ratio of the read load to read and write loads does not exceed 50% at the time of the migration. In this case, resource utilization efficiency realized by separation of read and write between the nodes can exceed 50% of the maximum processing capability of one node because of less transfer.

Furthermore, at the time of the migration, it is preferable to preferentially migrate the volume with the heavier write processing load to the migration destination storage controller. This is because it is possible to promptly and reliably reduce the load of the migration source storage apparatus.

<Storage Apparatus>

Figure 4:
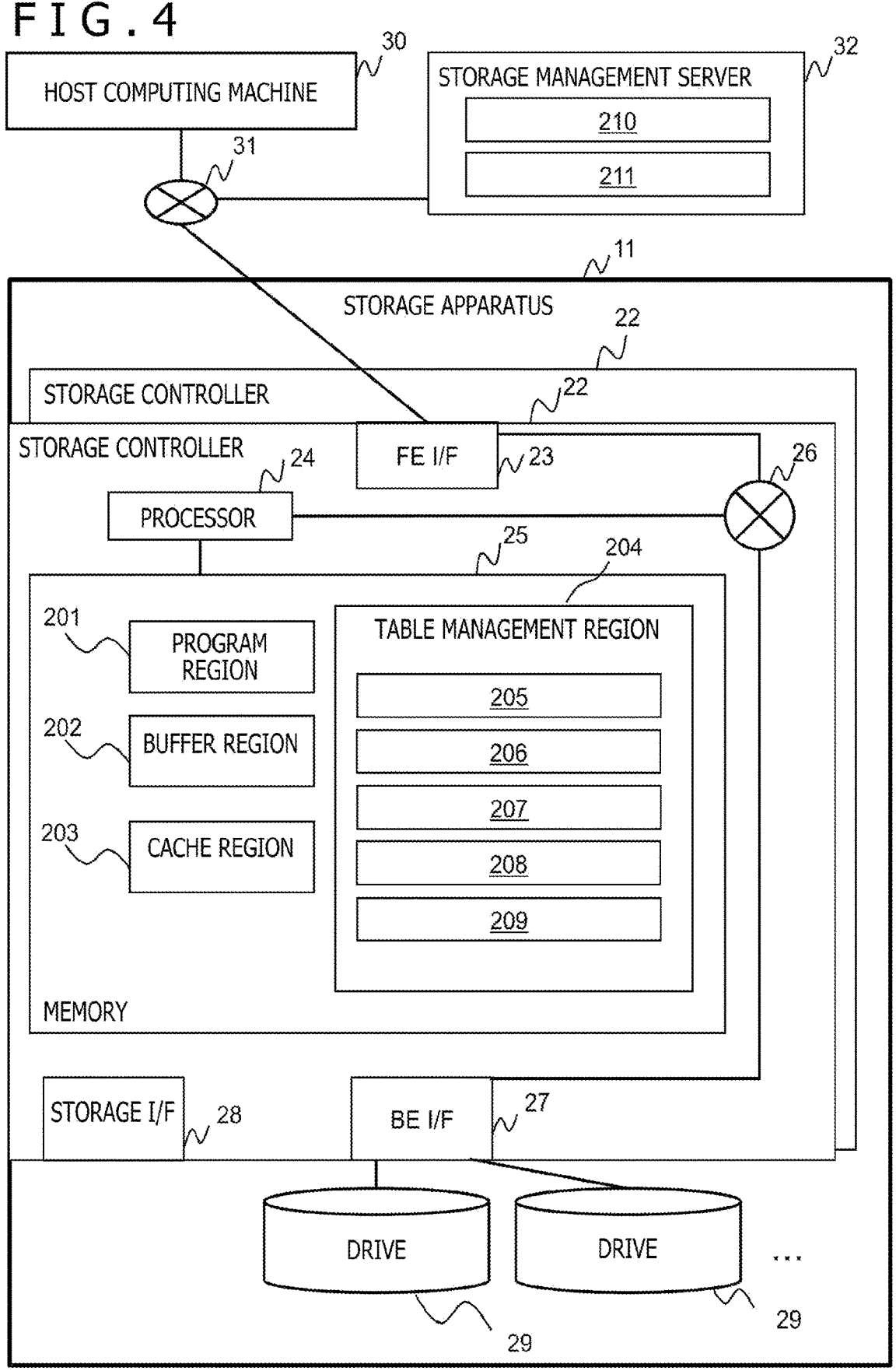
FIG. 4 is a block diagram illustrating configurations of a storage apparatus according to an embodiment of the present invention.

FIG. 4 is a block diagram illustrating configurations of the storage apparatus 11 according to the embodiment of the present invention.

The storage apparatus 11 has one or more storage controllers 22 and various drives 29 connected to the one or more storage controllers 22.

Each storage controller 22 is provided with a front-end interface device (FE_I/F) 23 holding communication with the host computing machine 30 and the storage management server 32, a storage interface device (storage I/F) 28 for holding communication between the storage apparatuses 11, a processor 24 that exercise control over the entire apparatus 11, a memory 25 that stores programs and information used by the processor 24, a back-end interface device (BE_I/F) 27 holding communication with the drives 29, and an internal network 26 that connects these constituent elements.

The memory 25 has a program region 201 that manages the programs, a buffer region 202 that is a temporary storage region at times of transfer and copying of data, a cache region 203 that temporarily stores write data from the host computing machine 30 (data written in response to a write instruction) and read data from each of the drives 29 (data read in response to a read instruction), and a table management region 204 that stores various tables.

The drives 29 are each an apparatus that has a non-volatile data storage medium and that physically stores data, and may include a plurality of types of drives different in performance. Each drive 29 includes, for example, a hard disk drive having an interface compliant with such a standard as Fibre channel (FC), non-volatile memory express (NVMe), serial attached SCSI (SAS), or serial advanced technology attachment (SATA), or a solid state drive (SSD) higher than the hard disk drive in I/O throughput performance and I/O response performance.

The SSD is a semiconductor storage medium that has a plurality of flash memories and an SSD controller that controls those flash memories, and an outer appearance shape and the like of the SSD are not limited to those in a form factor. Furthermore, non-volatile semiconductor memories such as NOR or NAND memories may be used as the flash memories. Moreover, various semiconductor memories such as magnetoresistive random access memories (MRAMs) that are magnetoresistive memories, resistance random access memories (ReRAMs) that are resistance change memories, or ferroelectric random access memories (FeRAMs) that are ferroelectric memories may be used as an alternative to the flash memories.

The FE_I/F 23, the BE_I/F 27, and the storage I/F 28 are an example of an interface section. The memory 25 is an example of a memory section. The processor 24 is an example of a processor section.

It is noted that FIG. 4 illustrates the configurations common to the migration source and the migration destination. However, in the case of expressing the migration source as the storage apparatus 11A and the migration destination as the storage apparatus 11B as depicted in, for example, FIG. 2, the constituent elements belonging to those storage apparatuses 11A and 11B are often distinguished from each other by adding "A," "B," or the like to the reference characters. For example, the volume of the migration source storage apparatus 11A is often expressed as "volume 1000A," and the volume of the migration destination storage apparatus 11B is often expressed as "volume 1000B."

Moreover, the table management region 204 stores therein a logical-to-physical translation table 205, a volume management table 206, a management table 207 for RAID group allocation to pools, a management table 208 for drive allocation to RAID groups, and a per-volume I/O load information management table 209.

Furthermore, the storage management server 32 has a volume load management table 210 and a volume placement management table 211 for use in management of each storage apparatus 11.

<Specific Examples of Data>

FIG. 5 is an explanatory diagram illustrating an example of configurations of the logical-to-physical translation table 205. The logical-to-physical translation table 205 stores, per record, a logical address 51, an update bit 52, a node ID 53, a physical address 54, and a data size 55 designated by the host computing machine 30. By referring to this logical-to-physical translation table 205, therefore, it is possible to locate a correspondence relation between the logical address 51 and the physical address 54.

FIG. 6 is an explanatory diagram illustrating an example of configurations of the volume management table 206. The volume management table 206 stores, per record, a volume ID 61, a volume attribute 62, a volume capacity 63, a volume consumed capacity 64, a volume logical address 65, and an allocation destination pool ID 66.

FIG. 7 is an explanatory diagram illustrating an example of configurations of the management table 207 for RAID group allocation to pools. The management table 207 for RAID group allocation to pools stores, per record, a pool ID 71, a pool capacity 72, a pool consumed capacity 73, a depletion threshold 74, and a RAID group ID 75.

FIG. 8 is an explanatory diagram illustrating an example of configurations of the management table 208 for drive allocation to RAID groups. The management table 208 for drive allocation to RAID groups stores, per record, a RAID group ID 81, a RAID level 82, a drive ID 83, a drive type 84, a capacity 85, and a used capacity 86.

FIG. 9 is an explanatory diagram illustrating an example of configurations of the per-volume I/O load information management table 209. The per-volume I/O load information management table 209 stores, per record, a volume ID 91, an I/O limiting threshold 92, an I/O effective value 93, an I/O load 94, a write I/O 95, a write I/O load 96, a read I/O 97, and a read I/O load 98.

FIG. 10 is an explanatory diagram illustrating an example of configurations of the volume load management table 210. The volume load management table 210 stores, per record, a volume ID 101, a volume logical capacity 102, a volume consumed capacity 103, an I/O limiting value 104, an I/O effective value 105, and an allocation destination node ID 106. A node means herein each storage apparatus 11.

FIG. 11 is an explanatory diagram illustrating an example of configurations of the volume placement management table 211. The volume placement management table 211 stores, per record, a node ID 111, an amount of space 112, an overload threshold 113, an effective load 114, a distributable load 115, and a read load from other node 116. FIG. 11 illustrates a state of migration of the volume from the storage apparatus having a node ID "0" to the storage apparatus having a node ID "1." A write load of the migrated volume is 39% of the processing capability and the read load is 9% thereof.

<Logical Storage Layers>

Figure 12:
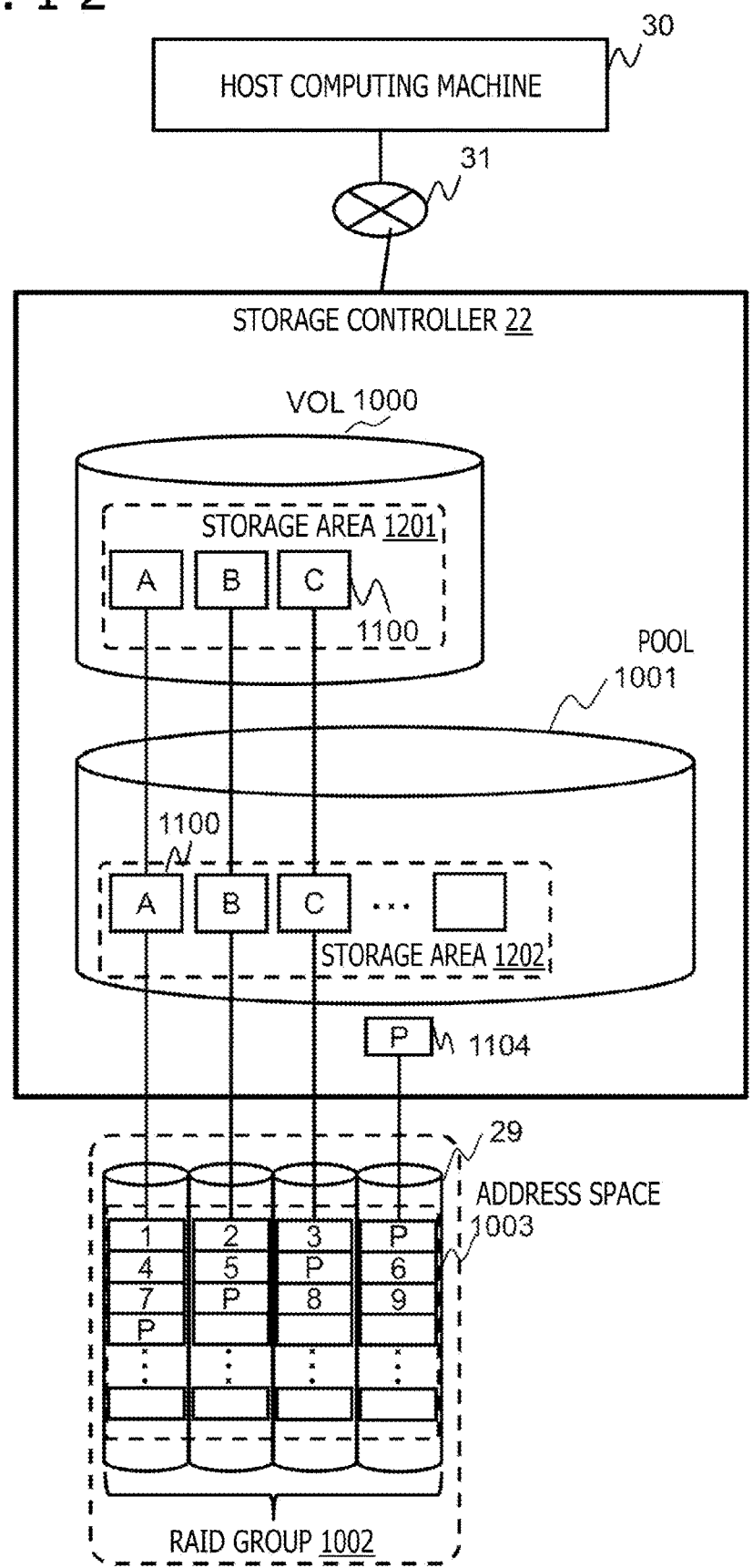
FIG. 12 is an explanatory diagram illustrating an example of configurations of logical storage layers managed by the storage apparatus according to the present embodiment.

FIG. 12 is an explanatory diagram illustrating an example of configurations of physical storage layers managed by the storage apparatus 11 according to the present embodiment.

The VOL 1000 is provided to the host computing machine 30. It is noted that allocation from the VOL 1000 to the pool 1001 is managed on the basis of the management table for pool allocation 207. Furthermore, allocation from the pool 1001 to drive address spaces 1003 (that is, a plurality of drive address spaces provided by a plurality of drives 29 configuring a RAID group 1002) is managed on the basis of the management table for drive allocation 208.

<Description of Processing>

Figure 13:
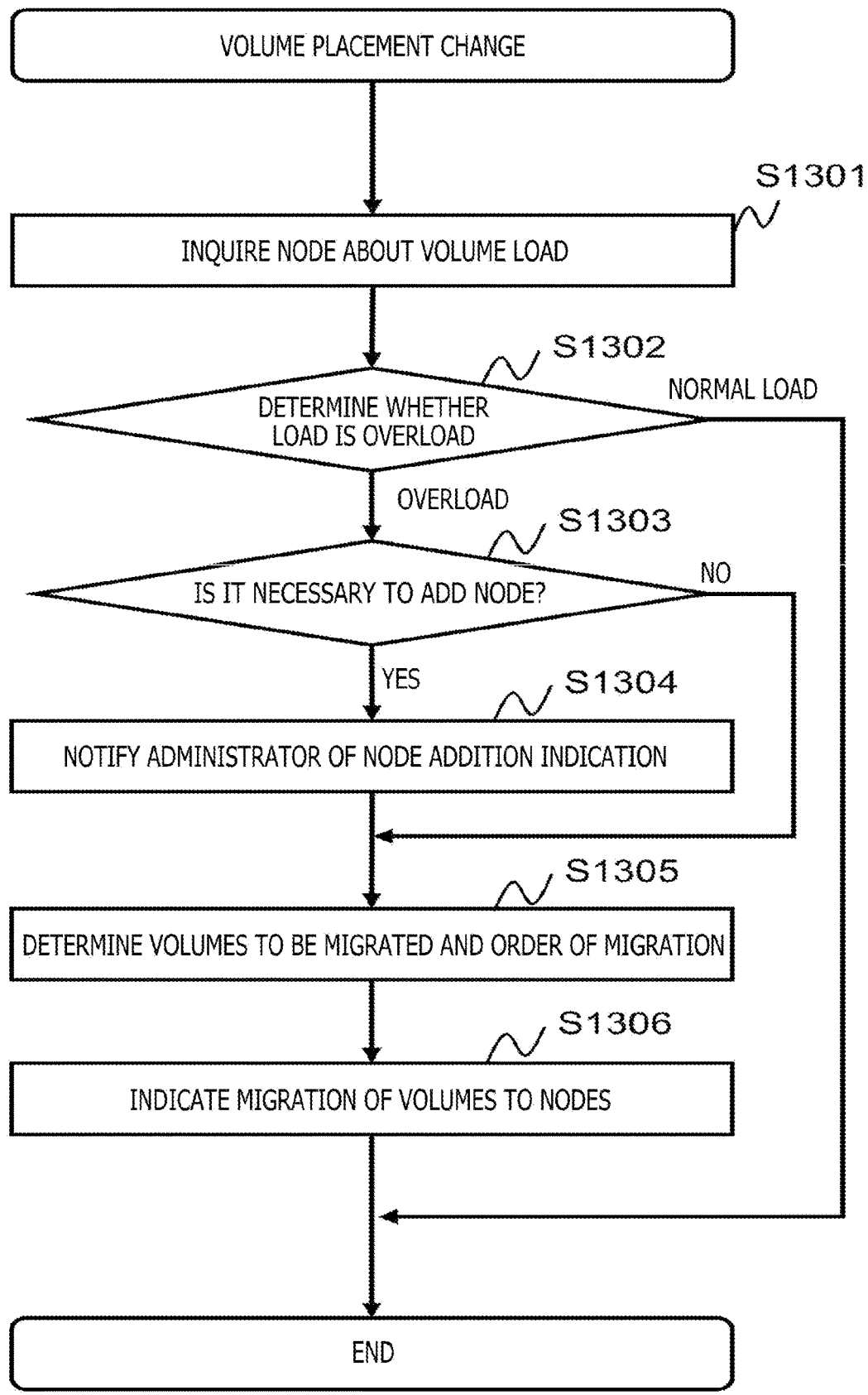
FIG. 13 is a flowchart illustrating volume placement change processing procedures.

FIG. 13 is a flowchart illustrating volume placement change processing procedures. The storage management server 32 starts this processing when receiving a rebalance check operation or detecting a failure in the storage apparatus 11.

The storage management server 32 first inquires the node, that is, the storage apparatus 11 about a volume load (Step S1301) and performs overload determination (Step S1302). The storage management server 32 ends the processing as it is in a case of determining a normal state in which an overload does not occur.

On the other hand, in a case of determining that the overload occurs, the storage management server 32 determines whether it is necessary to add a node (Step S1303), and notifies an administrator of a node addition indication (Step S1304) in a case in which it is necessary to add a node.

In a case in which it is unnecessary to add a node or in a case in which a node is added on the basis of the node addition indication, the storage management server 32 determines volumes to be migrated and an order of migration (Step S1305). The volumes to be migrated (in the migration source and the migration destination) and the order of migration are determined on the basis of the write load of each volume in such a manner that an effect of the migration can be obtained early without degradation of the processing performance, as already described.

Subsequently, the storage management server 32 indicates volume migration to the migration source node and the migration destination node (Step S1306), and ends the volume placement change processing.

Figure 14:
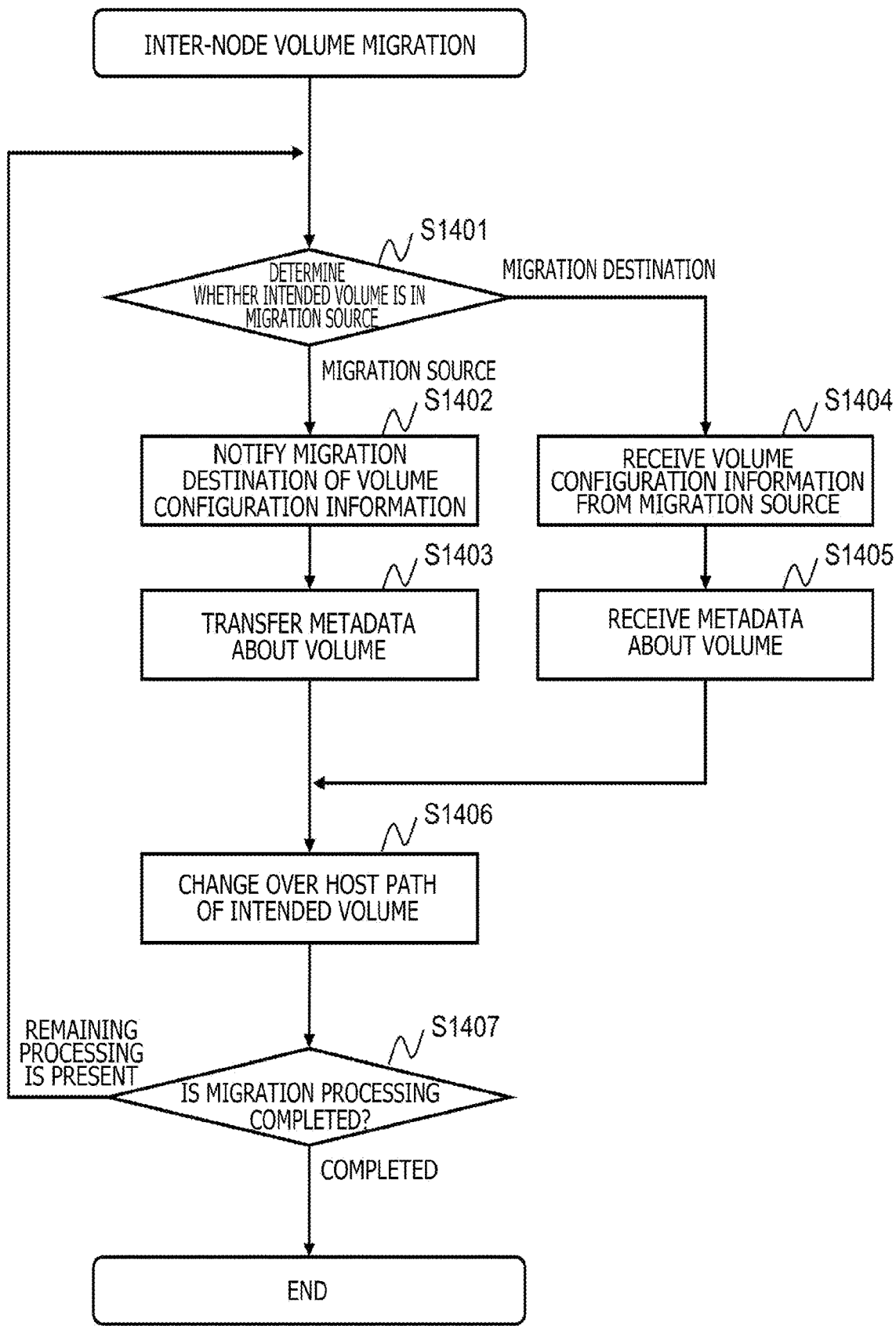
FIG. 14 is a flowchart illustrating inter-node volume migration processing procedures.

FIG. 14 is a flowchart illustrating inter-node volume migration processing procedures. Upon receiving a volume migration indication from the storage management server 32, the storage apparatus 11 determines whether an intended volume is in the migration source (Step S1401).

In a case in which the intended volume is the migration source, the storage apparatus 11 notifies the migration destination of volume configuration information (Step S1402), and transfers metadata about the volume (Step S1403).

In a case in which the intended volume is the migration destination, the storage apparatus 11 receives the volume configuration information from the migration source (Step S1404), and receives the metadata about the volume (Step S1405).

After end of Step S1403 or S1405, the storage management server 32 changes over a host path of the intended volume (Step S1406). Subsequently, the storage management server 32 determines whether the migration processing is completed (Step S1407). In a case of presence of remaining processing as a result of determination, the processing goes to Step S1401. Upon completion of the migration processing, the migration processing procedures are ended.

Figure 15:
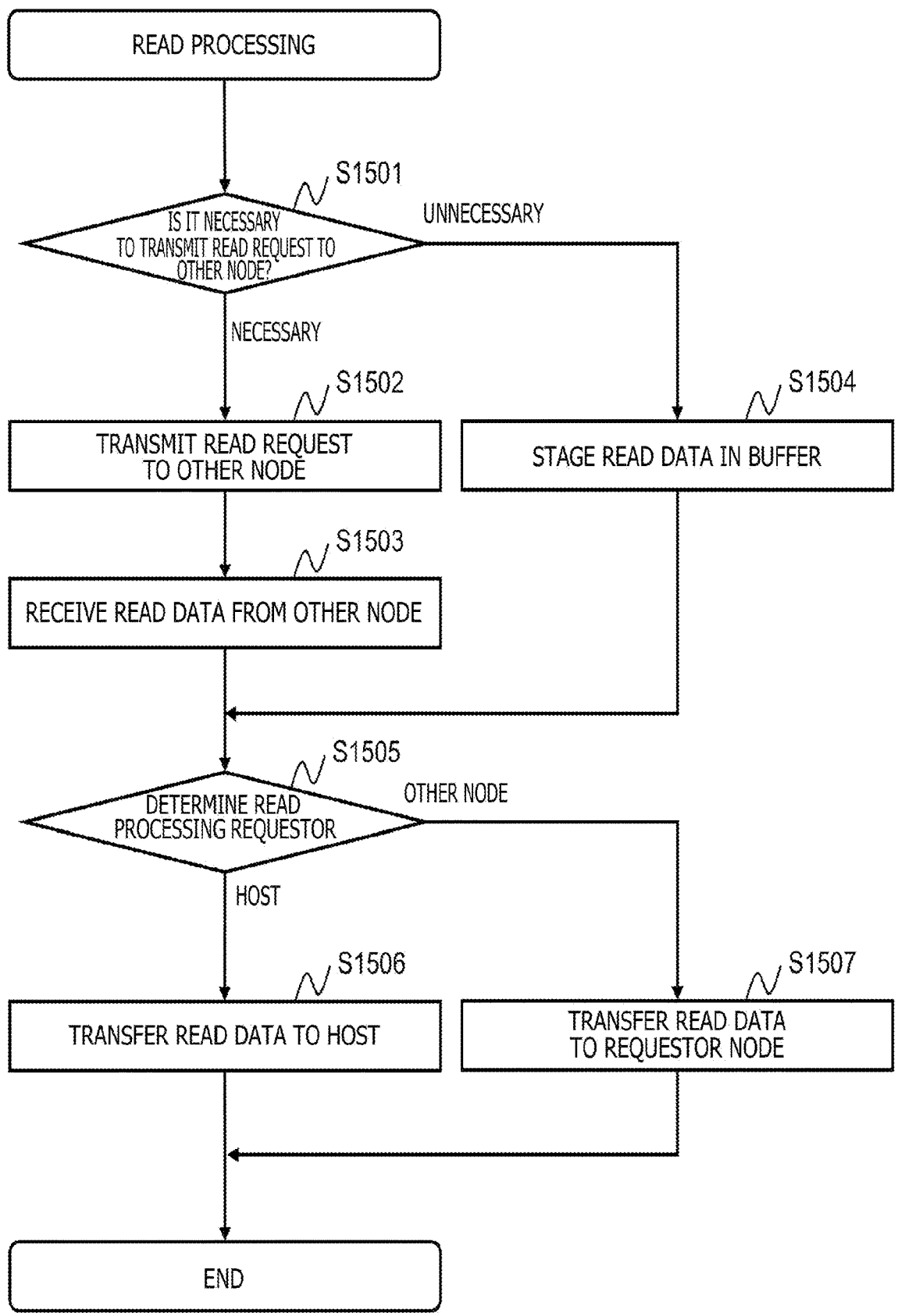
FIG. 15 is a flowchart illustrating read processing procedures.

FIG. 15 is a flowchart illustrating read processing procedures. Upon receiving a read request from the host computing machine 30 or the other node, the storage apparatus 11 determines whether it is necessary to transmit a read request to the other node (Step S1501). A case in which it is necessary to transmit a read request to the other node is a case in which the own node, that is, the storage apparatus 11 is a volume migration destination and receives a read request to read data from the volume accepting the migration from the host computing machine 30.

In a case in which it is necessary to transmit a read request to the other node, the storage apparatus 11 transmits a read request to the other node, that is, the migration source storage apparatus 11 (Step S1502), and receives read data from the other node (Step S1503). Meanwhile, in a case in which it is unnecessary to transmit a read request to the other node, the storage apparatus 11 stages the read data in a buffer (Step S1504).

After Step S1503 or S1504, the storage apparatus 11 determines a read processing requestor (Step S1505). In a case in which the read processing requestor is the host computing machine 30, the storage apparatus 11 transfers the read data to the host computing machine 30 (Step S1506) and ends the processing. Meanwhile, in a case in which the read processing requestor is the other node, the storage apparatus 11 transfers the read data to the requestor node (Step S1507) and ends the processing.

Figure 16:
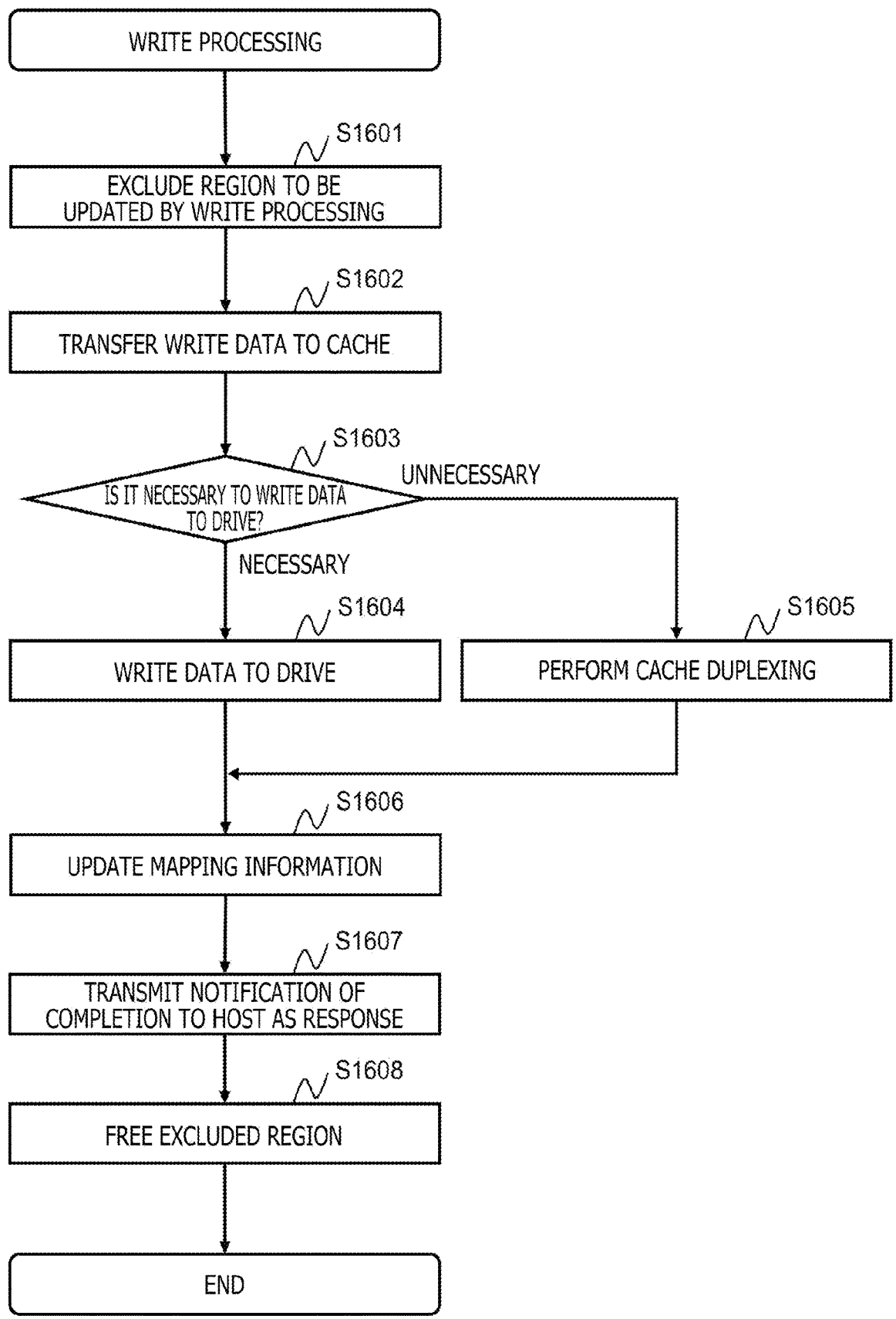
FIG. 16 is a flowchart illustrating write processing procedures.

FIG. 16 is a flowchart illustrating write processing procedures. Upon receiving a write request from the host computing machine 30, the storage apparatus 11 first excludes a region to be updated by write processing (Step S1601) and transfers write data to a cache (Step S1602).

Subsequently, the storage apparatus 11 determines whether it is necessary to write data to the drive (Step S1603). Specifically, in a case in which it is impossible to perform cache duplexing due to a failure or the like, the storage apparatus 11 determines that it is necessary to write data to the drive.

In a case of determining that it is necessary to write data to the drive, the storage apparatus 11 writes data to the drive (Step S1604). On the other hand, in a case of determining that it is unnecessary to write data to the drive, the storage apparatus 11 performs cache duplexing (Step S1605).

After Step S1604 or S1605, the storage apparatus 11 updates mapping information (Step S1606), and transmits a notification of completion to the host computing machine 30 as a response (Step S1607). Subsequently, the storage apparatus 11 frees the excluded region (Step S1608), and completes the processing.

<Modification>

In the description given so far, each storage apparatus 11 includes the pool 1001 and the configurations of writing data to the pool 1001 of the migration destination storage apparatus 11 after the volume migration have been described as an example. However, such configurations do not limit the present invention and the present invention is also applicable to configurations of using a common storage drive.

Figure 17:
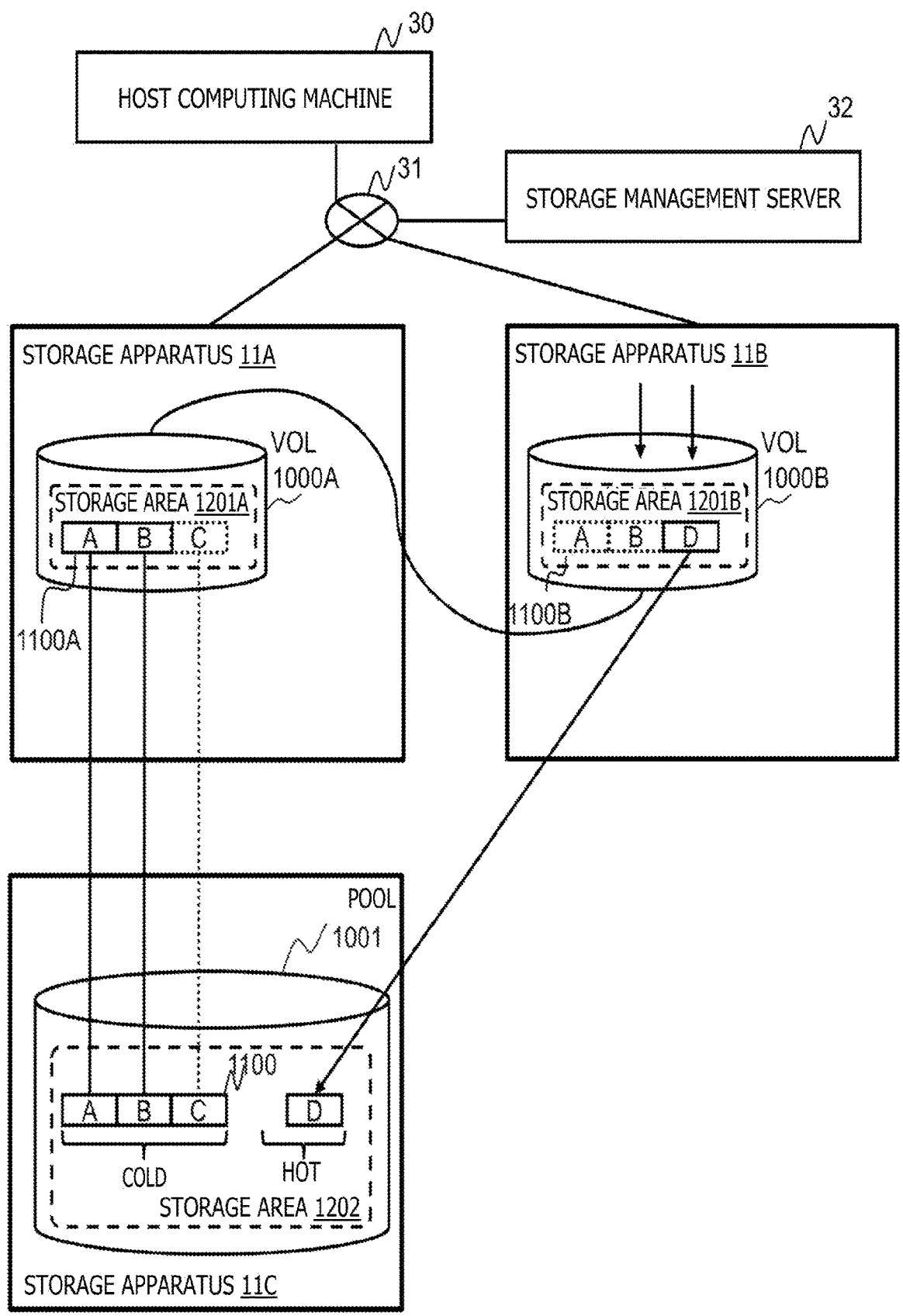
FIG. 17 is an explanatory diagram of a case of storage drive sharing.

FIG. 17 is an explanatory diagram of a case of storage drive sharing. In FIG. 17, the host computing machine 30 is connected to the storage apparatuses 11A and 11B via the network 31.

Each of the storage apparatuses 11A and 11B is further connected to the storage management server 32 via the network 31. Furthermore, the storage apparatuses 11A and 11B are connected to a storage apparatus 11C and the pool 1001 of the storage apparatus 11C is shared between the storage apparatuses 11A and 11B.

FIG. 17 illustrates a state in which the volume 1000A of the storage apparatus 11A is migrated to the volume 1000B of the storage apparatus 11B, and in which the access destination of the host computing machine 30 is changed over from the storage apparatus 11A to the storage apparatus 11B.

The storage area 1201A in the volume 1000A of the storage apparatus 11A corresponds to a storage area 1202 in the pool 1001 of the storage apparatus 11C. The data 1100A is stored in the storage area 1201A at the timing of the migration, and the data 1100A contains "A," "B," and "C." Data 1100 is stored in the corresponding storage area 1202 at the timing of the migration, and the data 1100A contains "A," "B," and "C."

The volume 1000A is migrated to the volume 1000B of the storage apparatus 11B as a result of the migration. The storage area 1201B in the volume 1000B also corresponds to the storage area 1202 in the pool 1001 of the storage apparatus 11C.

The data 1100B in the storage apparatus 11B does not reflect the data 1100A at the timing of the migration. However, in the case of a read request, the storage apparatus 11B asks the storage apparatus 11A to read data from the data 1100A (that is, from the pool 1001 of the storage apparatus 11C). The host computing machine 30 can, therefore, read data without influence of the migration. Furthermore, as for data writing, the data 1100B is updated by causing the storage apparatus 11B to write data to the pool 1001 of the storage apparatus 11C. FIG. 17 illustrates a state in which "C" is updated to "D" and in which the data 1100B contains "A," "B," and "D." It is noted herein that the pool 1001 of the storage apparatus 11C holds write data as differential data without updating the data 1100.

As described above, the storage system according to the present embodiment is a storage system including: a storage drive that physically stores data; and a plurality of storage apparatuses each including a controller and providing a volume from and to which a host inputs and outputs data, each of the storage apparatuses generating access data and writing data into the storage drive at a time of write processing for writing data to the volume, and accessing data in the storage drive using the access data at a time of read processing for reading data from the volume, and in a case of migrating the volume together with the access data between the plurality of storage apparatuses, one responsible for the write processing on the volume is migrated to a migration destination storage apparatus at a time of migration of the access data, and one responsible for the read processing on the volume is performed by a migration source storage apparatus using the access data, and the one responsible for the read processing is migrated to the migration destination storage apparatus after the access data is available for the migration destination storage apparatus. With such configurations and operations, the storage system can migrate the processing of the storage apparatus while maintaining availability and performance.

Furthermore, according to the present embodiment, at the time of migration of the access data, the migration destination storage apparatus creates access data about the data on which the migration destination storage apparatus performs the write processing, and the migration destination storage apparatus merges the generated access data with the migrated access data. Moreover, the migration destination storage apparatus is responsible for the read processing on the data on which the migration destination storage apparatus performs the write processing, and accesses the data using the access data generated by the migration destination storage apparatus. Since the write load is generally heavier than the read load, the migration of the write processing makes it possible to suppress an increase in the load of the storage controller as the redundant controller and to prevent the performance degradation.

Furthermore, according to the present embodiment, the migration destination storage apparatus serves as an access destination of the host at the time of the migration of the access data, and transfers an access request for which the migration source storage apparatus is responsible to the migration source storage apparatus. Owing to this, it is possible to promptly migrate the write processing.

Moreover, the migration source storage apparatus has a plurality of the controllers sharing the access data and capable of mutually assuming processing, and the volume is migrated to the migration destination storage apparatus that does not share the access data, in a case of occurrence of a failure in one of the controllers of the migration source storage apparatus.

Furthermore, in a case in which the migration source storage apparatus is responsible for processing related to a plurality of volumes, the storage system can select one volume to be migrated from among the plurality of volumes on the basis of a write processing load relative to a read processing load. Moreover, the storage system can select one volume to be migrated and the migration destination storage apparatus on the basis of a sum of the read processing load and the write processing load and an excessive resource of the migration destination storage apparatus. With such configurations, it is possible to realize efficient volume migration according to the loads and the excessive resource.

Moreover, according to the present embodiment, each of the plurality of storage apparatuses includes the storage drive, and the controller performs the write processing and the read processing on the storage drive in the storage apparatus to which the controller belongs, and the data is migrated together with the access data between the storage apparatuses; the migration destination storage apparatus performs the write processing into the storage drive belonging to the migration destination storage apparatus after the one responsible for the write processing on the volume is migrated to the migration destination storage apparatus; and the migration destination storage apparatus performs the read processing from the storage drive belonging to the migration destination storage apparatus after the access data is available for the migration destination storage apparatus and the one responsible for the read processing is migrated to the migration destination storage apparatus.

Furthermore, according to the modification, each of the plurality of storage apparatuses is accessible to the storage drive, and it is unnecessary to migrate the data between the storage apparatuses at a time of migration of the write processing and the read processing between the storage apparatuses.

Moreover, the migration processing method according to the present embodiment is a processing migration method in a storage system including a storage drive that physically stores data and a plurality of storage apparatuses each including a controller and providing a volume from and to which a host inputs and outputs data, the processing migration method including: by each of the storage apparatuses, generating access data and writing data into the storage drive at a time of write processing for writing data to the volume, and accessing data in the storage drive using the access data at a time of read processing for reading data from the volume; and in a case of migrating the volume together with the access data between the storage apparatuses, migrating one responsible for the write processing on the volume to a migration destination storage apparatus at a time of migration of the access data, and one responsible for the read processing on the volume being performed by a migration source storage apparatus using the access data, and migrating the one responsible for the read processing to the migration destination storage apparatus after the access data is available for the migration destination storage apparatus. With such configurations and operations, the migration processing method can migrate the processing of the storage apparatus while maintaining availability and performance.

It is noted that the present invention is not limited to the embodiment described above and encompasses various modifications. For example, the embodiment has been described in detail for describing the present invention so as to easily understand the present invention, and the present invention is not always limited to the invention having all the configurations described above. Furthermore, such configurations can be deleted and replacement or addition of configurations can be also made.

Moreover, part of or entirety of the configurations, the functions, the processing section, the processing means, and the like described above may be realized by hardware by being designed as, for example, integrated circuits. Furthermore, the present invention can be realized by a program code of software that realizes the functions of the embodiments. In this case, a storage medium that records the program code is provided to a computer, and a processor provided in the computer reads the program code stored in the storage medium. In this case, the program code read from the storage medium realizes per se the functions of the embodiments described above, and the program code per se and the storage medium storing the program code configure the present invention. For example, a flexible disk, a compact disc read only memory (CD-ROM), a digital versatile disc read only memory (DVD-ROM), a hard disk, a solid state drive (SSD), an optical disk, a magneto-optical disk, a compact disc-recordable (CD-R), a magnetic tape, a non-volatile memory card, or a ROM is used as the storage medium for supplying such a program code.

Furthermore, the program code realizing the functions described in the present embodiment can be implemented by a program or a script language in a wide range such as assembler, C/C++, perl, Shell, hypertext preprocessor (PHP), and Java (registered trademark).

In the embodiment described above, control lines and information lines considered to be necessary for description are illustrated and all control lines and information lines related to a product are not always illustrated. All of the configurations may be mutually connected.

What is claimed is:

1. A storage system comprising:
   a storage management server;
   a storage drive that physically stores data at physical data storage addresses therein; and
   a plurality of storage apparatuses, each including a corresponding controller and providing a corresponding logical volume from and to which a host inputs and outputs host data at logical data storage addresses therein, wherein
      each of the plurality of storage apparatuses generates corresponding access data that relates the logical data storage addresses in the corresponding logical volume to the physical data storage addresses in the storage drive and writes host data into the storage drive at a time of write processing for writing the host data to the corresponding logical volume, and accesses the host data in the storage drive using the corresponding access data at a time of read processing for reading the host data from the corresponding logical volume, and
      in a case of migrating the corresponding logical volume together with the corresponding access data from a one of the plurality of storage apparatuses to another of the plurality of storage apparatuses, the storage management server is configured to: migrate write processing on the corresponding logical volume from the migration source storage apparatus to a migration destination storage apparatus at a time of migration of the corresponding access data, while read processing on the corresponding logical volume is performed by the corresponding migration source storage apparatus using the corresponding access data,
   the storage manager server migrates the read processing from the migration source storage apparatus to the migration destination storage apparatus after the corresponding access data is available for the migration destination storage apparatus, and
   in a case in which the migration source storage apparatus is responsible for processing related to a plurality of corresponding logical volumes, the storage system selects one of the plurality of corresponding logical volumes to be migrated on a basis of a write processing load relative to a read processing load.

2. The storage system according to claim 1, wherein the migration destination storage apparatus creates access data about the host data on which the migration destination storage apparatus performs the write processing at the time of migration of the corresponding access data, and
   the migration destination storage apparatus merges the created access data with the migrated corresponding access data.

3. The storage system according to claim 2, wherein the migration destination storage apparatus performs the read processing on the host data on which the migration destination storage apparatus performs the write processing, and accesses the host data using the merged access data which includes the access data created by the migration destination storage apparatus.

4. The storage system according to claim 1, wherein the migration destination storage apparatus serves as an access destination of the host at the time of the migration of the corresponding access data, and transfers an access request for which the migration source storage apparatus is responsible to the migration source storage apparatus.

5. The storage system according to claim 1, wherein the migration source storage apparatus includes a plurality of controllers sharing the corresponding access data and each of the controllers is capable of mutually assuming processing of the host data, and the logical volume corresponding to the migration source storage apparatus is migrated to a migration destination storage apparatus that does not share the corresponding access data in a case of occurrence of a failure in one of the controllers of the migration source storage apparatus.

6. The storage system according to claim 1, wherein the storage management server selects a corresponding logical volume to be migrated and selects the migration destination storage apparatus on a basis of a sum of the read processing load and the write processing load and a processing capability of the migration destination storage apparatus.

7. The storage system according to claim 1, wherein the storage drive is a common storage drive and wherein each of the plurality of storage apparatuses includes the common storage drive, and the controller of each corresponding storage apparatus performs the write processing and the read processing on the common storage drive and the host data is migrated together with the corresponding access data, the migration destination storage apparatus performs the write processing into the common storage drive after the write processing on the logical volume corresponding to the migration source storage apparatus is migrated to the migration destination storage apparatus, and the migration destination storage apparatus performs the read processing from the common storage drive after the corresponding access data is available for the migration destination storage apparatus and the read processing on the migration source storage apparatus is migrated to the migration destination storage apparatus.

8. The storage system according to claim 1, wherein for each of the plurality of storage apparatuses, the corresponding logical volume is accessible to the storage drive, such that it is unnecessary to migrate the host data stored on the corresponding logical volume at a time of migration of the write processing and the read processing.

9. A processing migration method in a storage system including a storage drive that physically stores data at physical data storage addresses therein and a plurality of storage apparatuses each storage apparatus including a corresponding controller and each storage apparatus providing a corresponding logical volume from and to which a host inputs and outputs host data at logical data storage addresses therein, the processing migration method comprising:
  by each of the storage apparatuses, generating and storing corresponding access data relating the logical data storage addresses of the corresponding logical volume to the physical data storage addresses and writing host data into the storage drive at a time of write processing for writing the host data to the corresponding logical volume, and accessing the host data in the storage drive using the corresponding access data at a time of read processing for reading the host data from the corresponding logical volume; and
  in a case of migrating a corresponding logical volume together with the corresponding access data between the storage apparatuses, migrating the write processing on the corresponding logical volume from a migration source storage apparatus of the plurality of storage apparatuses to a migration destination storage apparatus at a time of migration of the corresponding access data, the read processing on the corresponding logical volume being performed by the migration source storage apparatus using the corresponding access data, and
  migrating the read processing from the migration source storage apparatus to the migration destination storage apparatus after the corresponding access data is available for the migration destination storage apparatus, and
    in a case in which the migration source storage apparatus is responsible for processing related to a plurality of corresponding logical volumes, the storage system selects one of the plurality of corresponding logical volumes to be migrated on a basis of a write processing load relative to a read processing load.

10. A storage system comprising:
a storage management server;
a storage drive that physically stores data at physical data storage addresses therein; and
a plurality of storage apparatuses each including a corresponding controller and providing a corresponding logical volume from and to which a host inputs and outputs host data at logical data storage addresses therein, wherein
  each of the plurality of storage apparatuses generates corresponding access data that relates the logical data storage addresses in the corresponding logical volume to the physical data storage addresses in the storage drive and writes host data into the storage drive at a time of write processing for writing the host data to the corresponding logical volume, and accesses the host data in the storage drive using the corresponding access data at a time of read processing for reading the host data from the corresponding logical volume, and
    in a case of migrating the corresponding logical volume together with the corresponding access data from a one of the plurality of storage apparatuses to another of the plurality of storage apparatuses, the storage management server is configured to: migrate write processing on the corresponding logical volume from the migration source storage apparatus to a migration destination storage apparatus at a time of migration of the corresponding access data, while read processing on the corresponding logical volume is performed by the corresponding migration source storage apparatus using the corresponding access data,
  the storage manager server migrates the read processing from the migration source storage apparatus to the migration destination storage apparatus after the corresponding access data is available for the migration destination storage apparatus, and
  the storage drive is a common storage drive and wherein each of the plurality of storage apparatuses includes the common storage drive, and the controller of each corresponding storage apparatus performs the write processing and the read processing on the common storage drive and the host data is migrated together with the corresponding access data, the migration destination storage apparatus performs the write processing into the common storage drive after the write processing on the logical volume corresponding to the migration source storage apparatus is migrated to the migration destination storage apparatus, and the migration destination storage apparatus performs the read processing from the common storage drive after the corresponding access data is available for the migration destination storage apparatus and the read processing on the migration source storage apparatus is migrated to the migration destination storage apparatus.

* * * * *